(12) United States Patent  (10) Patent No.: US 9,216,714 B2
Seyffert et al.  (45) Date of Patent: Dec. 22, 2015

(54) BELT PRESENTER SYSTEM

(75) Inventors: Martin Seyffert, Pfullingen (DE); Karl Birk, Ebersbach (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 14/342,805

(22) PCT Filed: Sep. 10, 2012

(86) PCT No.: PCT/EP2012/003783
§ 371 (c)(1),
(2), (4) Date: Mar. 31, 2014

(87) PCT Pub. No.: WO2013/037471
PCT Pub. Date: Mar. 21, 2013

(65) Prior Publication Data
US 2014/0291975 A1 Oct. 2, 2014

(30) Foreign Application Priority Data
Sep. 12, 2011 (DE) .......................... 10 2011 112 831

(51) Int. Cl.
*B60R 22/03* (2006.01)

(52) U.S. Cl.
CPC ..................................... *B60R 22/03* (2013.01)

(58) Field of Classification Search
CPC ..................................................... B60R 22/03
See application file for complete search history.

(56) References Cited

U.S. PATENT DOCUMENTS

| | | | | |
|---|---|---|---|---|
| 4,589,680 A * | 5/1986 | Gurtler et al. | ............... | 280/801.1 |
| 4,629,214 A * | 12/1986 | Fohl | ............................... | 280/808 |
| 4,741,557 A * | 5/1988 | Jambor et al. | ............. | 280/801.2 |
| 6,267,409 B1 * | 7/2001 | Townsend et al. | ......... | 280/801.1 |
| 7,686,338 B2 * | 3/2010 | Dallwig et al. | ............. | 280/801.1 |
| 7,850,204 B2 * | 12/2010 | Freisleben et al. | .......... | 280/801.1 |
| 7,980,635 B2 * | 7/2011 | Matsushita | ................... | 297/483 |
| 8,042,866 B2 * | 10/2011 | Kling et al. | ................. | 297/216.1 |
| 8,157,292 B2 * | 4/2012 | You et al. | ...................... | 280/804 |
| 8,899,626 B2 * | 12/2014 | Birk et al. | ................... | 280/801.2 |
| 8,950,781 B2 * | 2/2015 | Seyffert et al. | ............. | 280/801.1 |
| 2006/0113785 A1 * | 6/2006 | Sugiyama et al. | ......... | 280/801.1 |
| 2009/0127840 A1 | 5/2009 | Freisleben et al. | | |

FOREIGN PATENT DOCUMENTS

| | | | |
|---|---|---|---|
| DE | 102004036361 A1 * | 3/2006 | |
| DE | 10 2005 059 453 | 6/2007 | |
| DE | 10 2006 008 930 | 8/2007 | |
| DE | 10 2008 020 911 | 10/2009 | |

\* cited by examiner

*Primary Examiner* — Nicole Verley
(74) *Attorney, Agent, or Firm* — Tarolli, Sundheim, Covell & Tummino LLP

(57) ABSTRACT

A belt presenter system for a seat belt system of a vehicle includes an arm (22) mounted on a vehicle pillar, wherein the arm (22) can adopt a feeding position (A) and a parking position (P). An end portion (40) of the arm (22) is connected to a fixed arm portion (36) via a hinge (42) so that the end portion (40) is bendable about a pivot axis relative to the fixed arm portion (36).

11 Claims, 19 Drawing Sheets

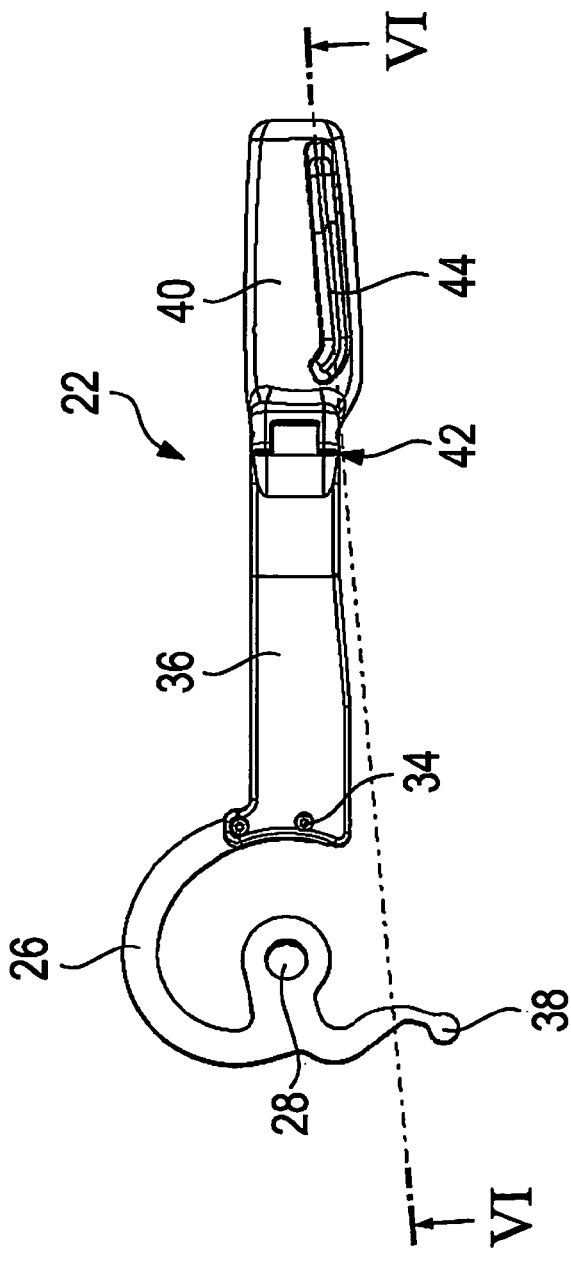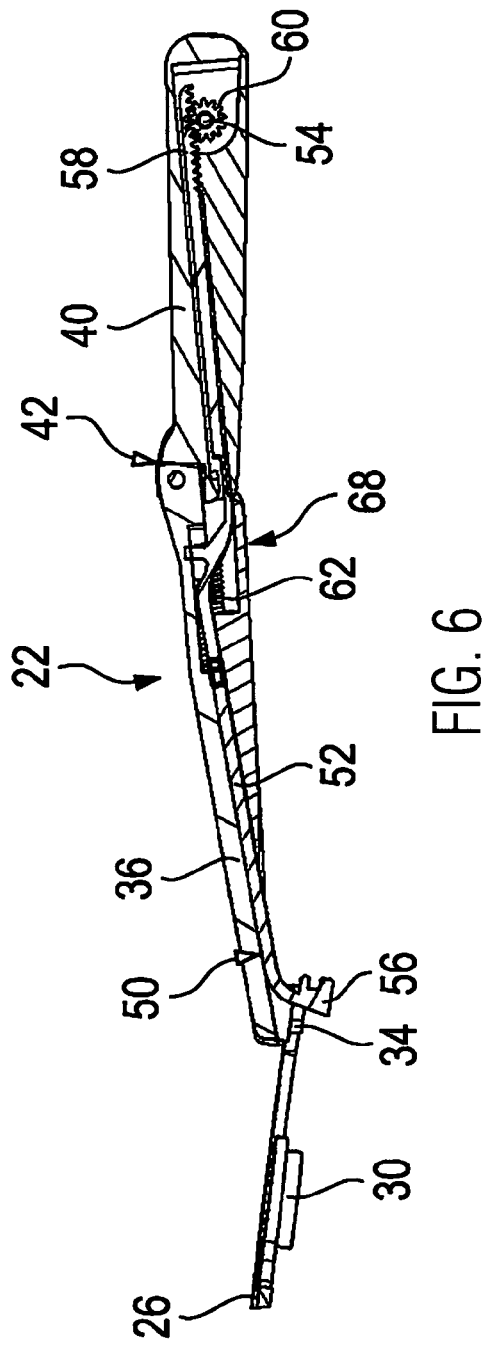

BELT PRESENTER SYSTEM

RELATED APPLICATIONS

This application corresponds to PCT/EP2012/003783, filed Sep. 10, 2012, which claims the benefit of German Application No. 10 2011 112 831.3, filed Sep. 12, 2011, the subject matter, of which are incorporated herein by reference in their entirety.

BACKGROUND OF THE INVENTION

The invention relates to a belt presenter system for a seat belt system of a vehicle.

Belt presenters that, while a vehicle occupant gets into the car, bring a portion of the seat belt into a feeding position in which it can be easily seized by the occupant are known primarily in two-door vehicles such as coupes or convertibles in which the deflection fitting at the B-pillar is distant from the front seats. It is desired, however, to offer this comfort to the occupants also in four-door or five-door vehicles. But it is a problem that in those vehicles the B-pillar is definitely narrower than in two-door vehicles and a linear displacing mechanism used in those vehicles cannot be employed for reasons of space. In order to be able to make better use of the restricted space, the belt presenter can be arranged at a height adjuster of the seat belt system, especially at the slide thereof. The belt presenter then is moved along with the height adjuster and no separate space must be provided for the belt presenter at the B-pillar.

SUMMARY OF THE INVENTION

It is the object of the invention to design a system comprising a belt presenter fastened to a vehicle pillar so that despite its position at the vehicle pillar the belt presenter is visually little disturbing and does not impede the safety systems provided.

This object is achieved by a belt presenter system of a vehicle, comprising an arm of a belt presenter pivoted to a vehicle pillar, the arm being adapted to adopt a feeding position and a parking position. An end portion of the arm is connected to a fixed arm portion via a hinge so that the end portion is bendable about a pivot axis relative to the fixed arm portion. By bending or pivoting the end portion, preferably in the parking position, the end portion of the arm can be brought more closely to the vehicle side wall and the lining of the B-pillar. In this way both a visually pleasing impression is created and a possible deployment of a thorax or head airbag arranged in the back rest of one of the front seats, for example, is not impeded by the arm of the belt presenter.

The arm is preferably pivoted to a height adjuster for the seat belt mounted on the vehicle pillar.

Preferably the end portion is folded out of a pivoting plane of the arm. The end of the end portion preferably moves (approximately) perpendicularly to the pivoting plane. The pivoting plane of the arm in this case is understood to be the plane swept by the arm from the parking position to the feeding position. This plane is substantially parallel to the vehicle side wall (while disregarding curvatures of vehicle components). In a normal position adopted during pivoting and in the feeding position, the end portion is provided in direct extension of the fixed arm portion and is substantially parallel to the latter. The arm can in total be slightly curved, the alignment of the two ends of the arm deviating not more than 20° from each other.

In the bent position the end portion preferably protrudes to the vehicle side wall, the end portion being bent vis-à-vis the fixed arm portion between 20° and 50°. The pivoting movement is substantially performed perpendicularly to the fixed arm portion, in a top view the end portion being maintained along the extension of the fixed arm portion.

Of preference, the end portion of the arm is bent position in the parking position, wherein in all other positions the end portion advantageously takes the normal position which is not bent. Especially in the feeding position it is of advantage to use the entire length of the arm. In the parking position, however, the arm is intended to open as far as possible the space in the vehicle interior.

In a preferred embodiment of the invention, the end portion of the arm in the bent position is accommodated in a recess of a vehicle lining, especially a lining of the B-pillar. The space required by the belt presenter is further minimized in that the end portion and thus part of the arm of the belt presenter are incorporated in the lining and advantageously do not project from the lining.

The arm preferably has a link portion which is rigidly connected to the fixed arm portion and which is fastened to the height adjuster in the state mounted on the vehicle. The link portion also includes a link point for fastening the arm to the vehicle. Advantageously, the link point of deflection fittings of the seat belt at the slide of the height adjuster can be used for fastening. The fixed arm portion is preferably rigidly linked vis-à-vis the pivot point of the arm.

In a preferred embodiment, at the link portion a first element of attack is provided which is in connection with a drive of the belt presenter and is movable by the same. The first element of attack can be realized, for example, by a protruding bracket, wherein it is important that there is a radial distance between the first element of attack and the pivot point of the link portion so that a linear movement of the first element of attack can be converted to a pivoting movement of the arm.

A moving mechanism for moving the end portion and including a second element of attack which is communicated with a drive of the belt presenter and can be actuated by the latter is advantageously provided at the arm. In this way the end portion can be pivoted independently of the pivoting movement of the arm. Nevertheless only one single drive is required for the two movements.

The moving mechanism can include, for instance, a transmission element interacting with a guide formed at the fixed arm portion and at the end portion which causes bending of the end portion when the transmission element is moved. The guide can be in the form of a link guide, for example, or in the form of interacting ramps or stops. Preferably the transmission element at the drive-side end supports the second element of attack so that a direct force transmission can be performed from the drive to the transmission element.

Advantageously, the drive includes a linearly movable drive element which engages in the first and/or second element of attack when the arm or the end portion is moved.

The drive element is preferably configured so that idling is provided between the movement of the second and the first elements of attack. This permits time-shifted performing the pivoting movement of the arm and the pivoting movement of the end portion. Idling can be realized, for example, by a play between the first element of attack and the drive element or by spring travel at the end of the adjusting movement of the first element of attack.

An advantageous realization consists, for example, in that during movement of the arm from the parking position into the feeding position firstly the second element of attack is actuated to pivot the end portion and only then the first element of attack is actuated to move the arm. Just as vice versa, upon pivoting from the feeding position into the parking position firstly the first element of attack and thus the arm is moved and only when the arm is in the parking position the second element of attack is moved and the end portion is pivoted into the bent position.

In this motion sequence the end portion is always provided in the normal position when the arm is pivoted. The parking position is left only when the pivoting movement of the end portion is completed, and only upon reaching the parking position the end portion is moved into the bent position.

In a preferred embodiment, the arm moreover includes a finger seizing the strap when the arm moves to the feeding position, wherein the finger is movably fastened to the end portion of the arm so that it can take a folded position in which it is located substantially in parallel to the end portion of the arm and an unfolded position in which the finger is orientated substantially perpendicularly to the end portion of the arm and to a pivoting plane of the arm.

Seizing and transporting the strap can also be carried out in any other way, as a matter of course. The use of the finger is favorable, however, because it can easily seize and transport the strap as it is preferably protruding perpendicularly from the arm. Outside the feeding operation the finger can be immersed in the arm by folding and with its end portion in the lining of the B-pillar so that no increased space is required for the belt presenter.

BRIEF DESCRIPTION OF THE DRAWINGS

Hereinafter the invention is described in detail by way of two embodiments and with reference to the enclosed drawings, in which:

FIGS. 5 to 9 are different views of the arm of FIG. 2;

DESCRIPTION OF EMBODIMENTS

Figure 1:
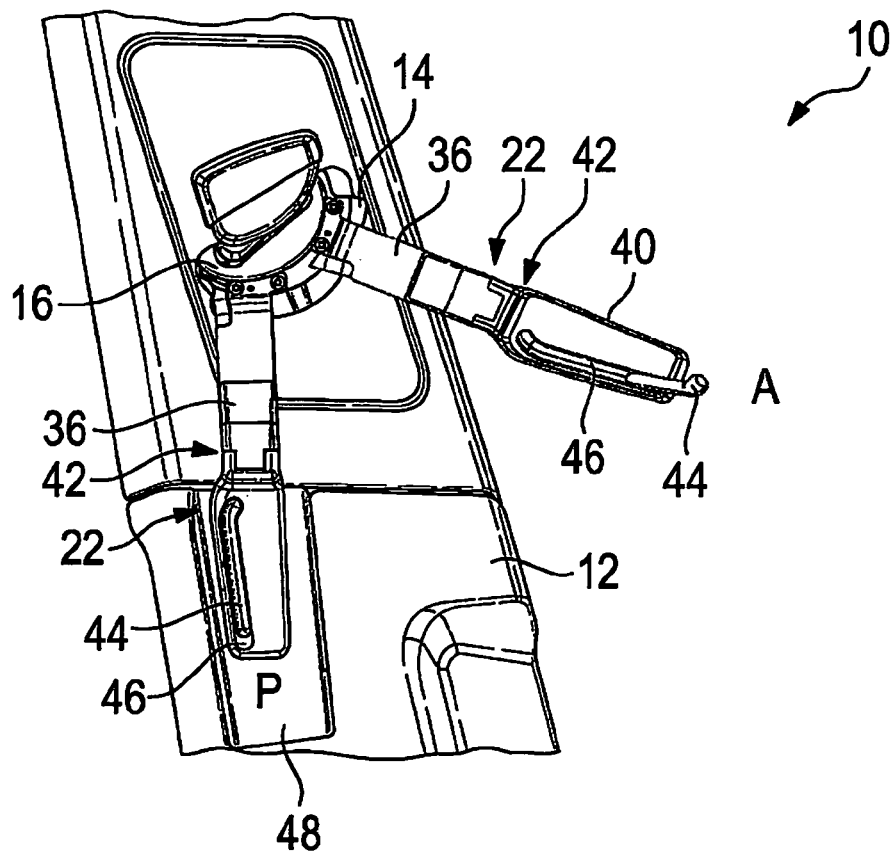
FIG. 1 shows a schematic perspective view of a belt presenter system according to the invention comprising a belt presenter according to the invention mounted on a height adjuster at the B-pillar of a vehicle, the arm being provided in the parking position and in the feeding position.
Figure 2:
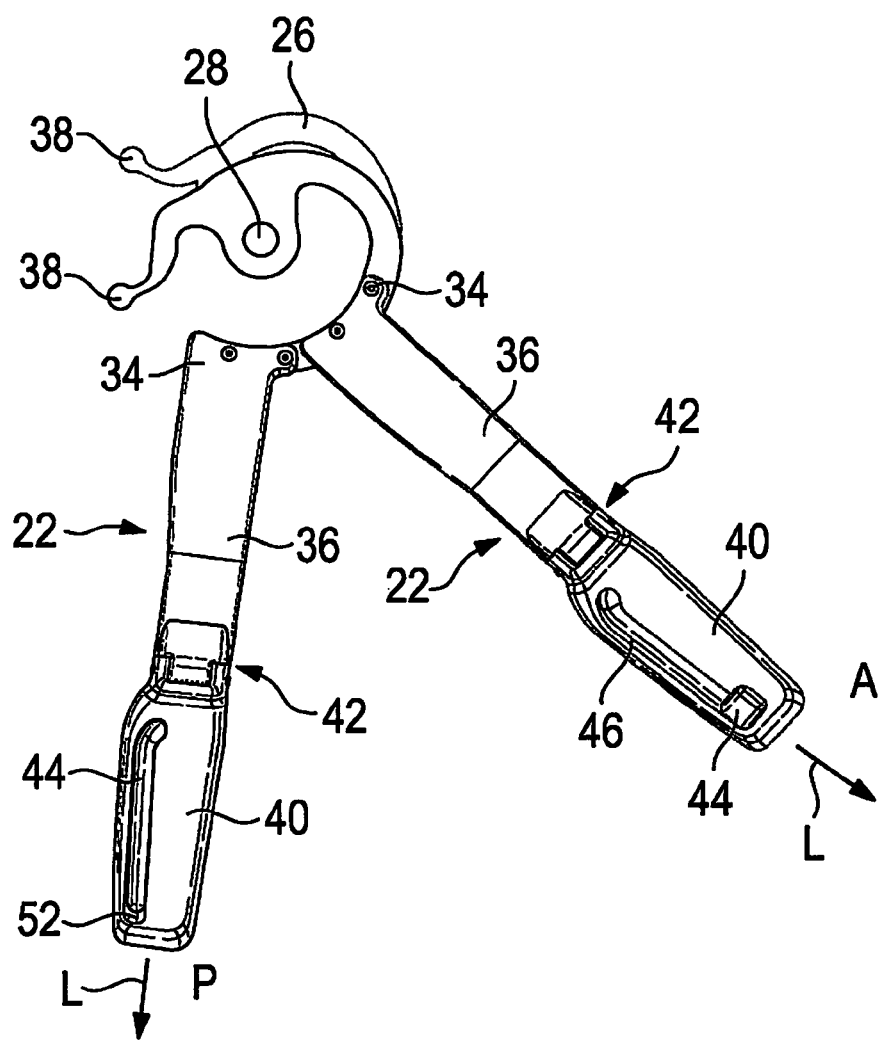
FIG. 2 shows the arm of the belt presenter of FIG. 1 both in the parking position and in the feeding position.

FIG. 1 shows a belt presenter system 10 in a seat belt system of a passenger car.

Figure 14:
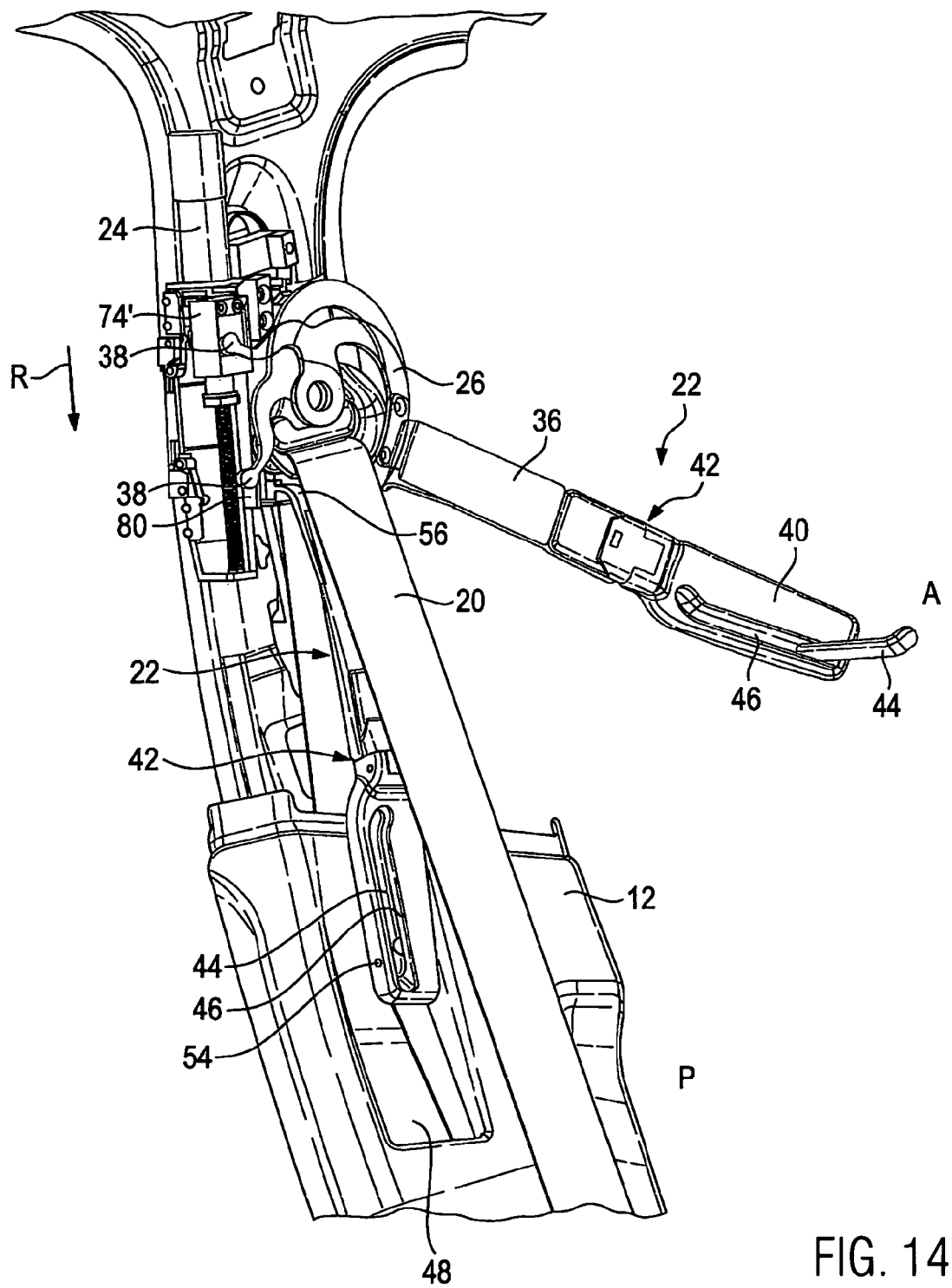
FIGS. 14 to 21 show the belt presenter system at different positions and at different positions of the height adjuster in a second variant.

The seat belt extends from a belt retractor not shown behind a lining 12 of the B-pillar of the vehicle to an aperture 14 in the lining 12 via deflection fittings 16 mounted on a slide 18 of a height adjuster (cf. also FIG. 14). From there the strap 20 extends along the known path to a link point fixed at the vehicle.

The belt presenter, especially an arm 22 and a drive 24, are equally mounted on the slide 18 of the height adjuster. The drive 24 could also be arranged at a different position in the vehicle, however.

The arm 22 has a link portion 26 (clearly visible in the FIGS. 2 to 9 and 11) having a link point 28 in the form of an eyelet by which the arm 22 is rotatably fixed to the link point of the deflection fittings 16 on the slide 18.

The link portion 26 in this embodiment is altogether punched out of sheet steel and is substantially even.

A washer 30 surrounds the eyelet of the link point 28 and provides freedom of movement vis-à-vis the deflection fittings 16.

The link portion 26 has a fastening portion 34 at which it is connected to a rigid arm segment 36 so that the link point 28 is located along an extension of the longitudinal direction L of the rigid arm segment 36. Between the fastening portion 34 and the link point 28 the link portion 26 is bent to be approximately C-shaped so as to provide space for the deflection fittings 16 when the arm 22 is mounted on the vehicle.

The link portion 26 moreover includes a first element of attack 38 in the form of an outwardly protruding bracket having a thickening at its free end.

Viewed from the top, in extension of the fixed arm portion 36 in the longitudinal direction L an end portion 40 is located which is connected to the fixed arm portion 36 via a hinge 42. The hinge 42 permits pivoting of the end portion 40 out of the plane which is defined by the arm and in which the latter is pivoted. The pivot axis of the end portion is perpendicular to the longitudinal direction L of the arm. The pivoting plane of the arm is located approximately in parallel to a vehicle side wall and to the surface of the lining 12 of the B-pillar.

The hinge 42 permits, in the state mounted on the vehicle, to pivot the end portion 40 into a bent position (cf. FIG. 14) in which the end portion 40 is bent vis-à-vis the fixed arm portion 36 toward the vehicle side wall and toward the lining 12 of the B-pillar. The end portion 40 is bent vis-à-vis the axis of the fixed arm portion 36 between 20° and 50°.

At the end portion 40 an unfolding finger 44 is mounted which is folded in the parking position P and is accommodated in a recess 46 of the end portion 40 so that it does not substantially project from the contour of the end portion 40. In the feeding position A the finger 44 is in an unfolded position in which it protrudes approximately 90° from the end portion 40 and is also aligned perpendicularly to the pivoting plane.

In the lining 12 of the B-pillar a recess 48 is formed (cf. for example FIG. 1 or FIG. 15) into which the end portion 40 protrudes in the bent position in the parking position P. The free end of the end portion 40 is completely located in the recess 48. Preferably the recess 48 is formed so that an as large part as possible of the end portion 40 is accommodated so that it does not project from the residual B-pillar lining 12.

In the parking position P the arm 22 is aligned substantially in parallel to the B-pillar and the lining 12 thereof, wherein the end portion 40 is in the bent position and is accommodated in the recess 48. The finger 44 is folded into the recess 46. The arm 22 always adopts this parking position P when the strap 20 shall not be brought into the feeding position A for the vehicle occupant. During normal vehicle operation the arm 22 therefore is always provided in the parking position P. If the strap 20 is to be brought into the feeding position A, however, e.g. because the feeding movement was requested at the push of a button or a suitable sensor arranged in the vehicle door or at the vehicle seat, for example, has detected a vehicle occupant getting into the car, firstly the end portion 40 is brought from the bent position into the normal position and then the finger 44 is unfolded into the unfolded position.

Figure 3:
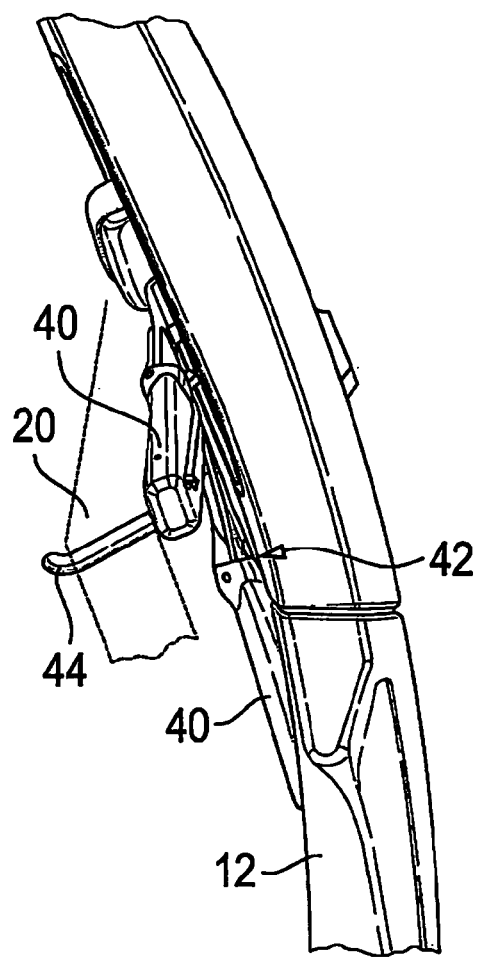
FIG. 3 is a side view of the belt presenter system of FIG. 1.
Figure 4:
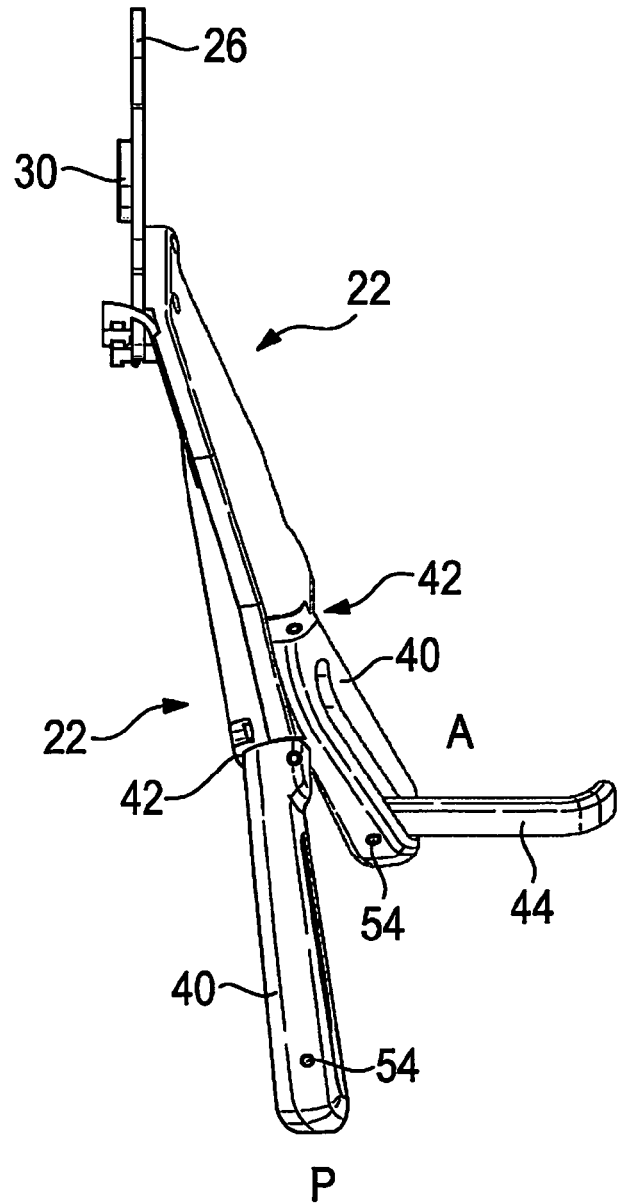
FIG. 4 is a side view of the arm of FIG. 2.
Figure 7:
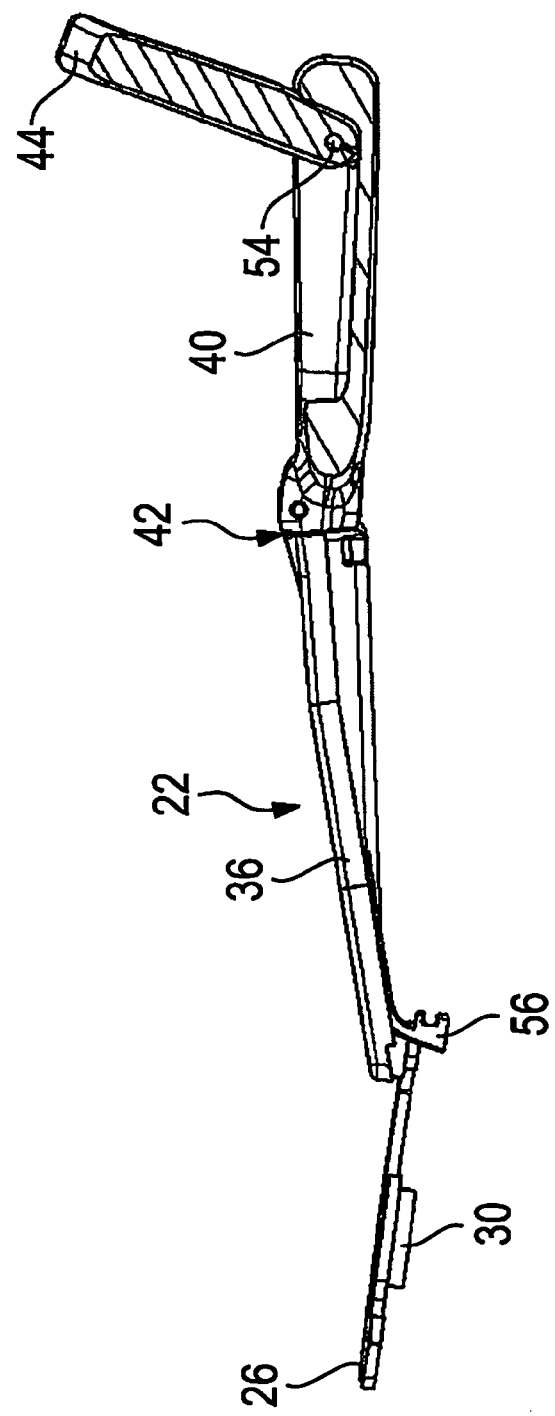

Subsequently, the entire arm 22 is pivoted about the link point 28, to the right in each of the Figures, wherein the finger 44 contacts the strap 20 in the parking position extending over the arm 22 and entrains the same, because the finger 44 is aligned approximately perpendicularly to the strap extension (cf. FIG. 3). The arm 22 is pivoted to the feeding position A (in this example approx. 65° vis-à-vis the parking position P) where the strap 20 is in a position in which it can be conveniently seized by the vehicle occupant so that the latter can fasten the seat belt.

As soon as the vehicle occupant's fastening of the seat belt has been detected (for example by detecting insertion of a plug-in tongue into the belt buckle) or else at the push of a button the arm 22 is returned to its parking position P again. When the arm 22 has reached the parking position P, at the end of the pivoting movement of the arm the finger 44 is moved to the folded position and subsequently the end portion 40 is traveled to the bent position so that it is accommodated in the recess 48 again.

The movement of the arm 22, the end portion 40 and the finger 44 is caused by the drive 24 and an appropriate mechanism described hereinafter.

Figure 8:
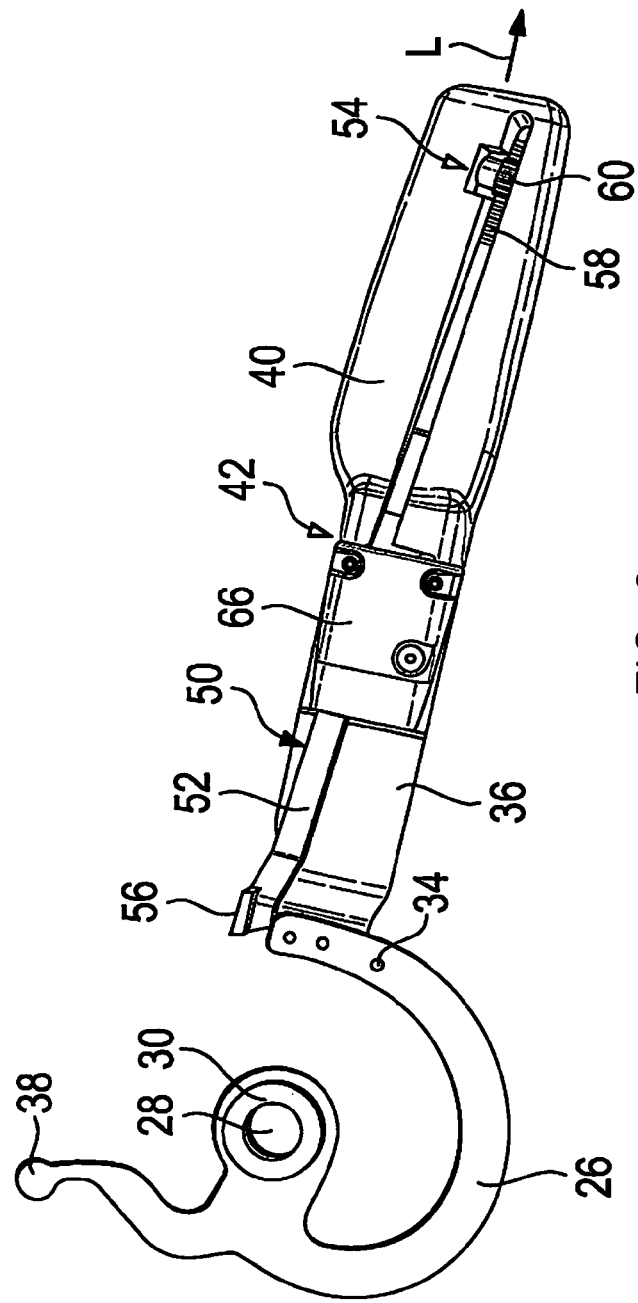
Figure 9:
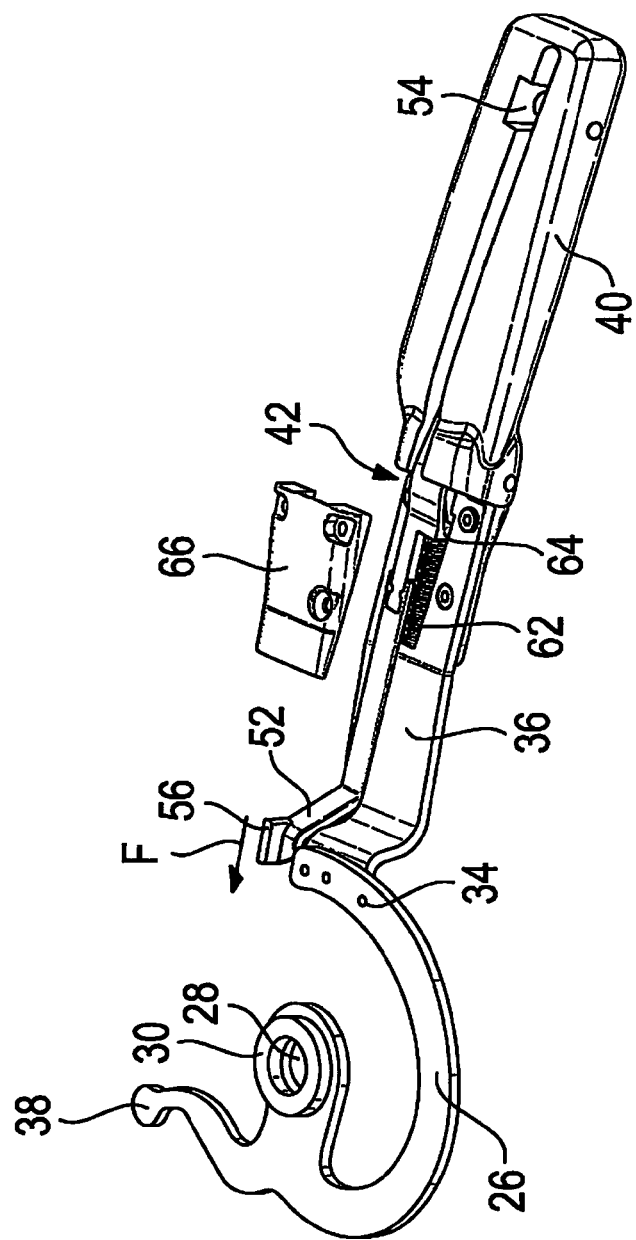
Figure 10:
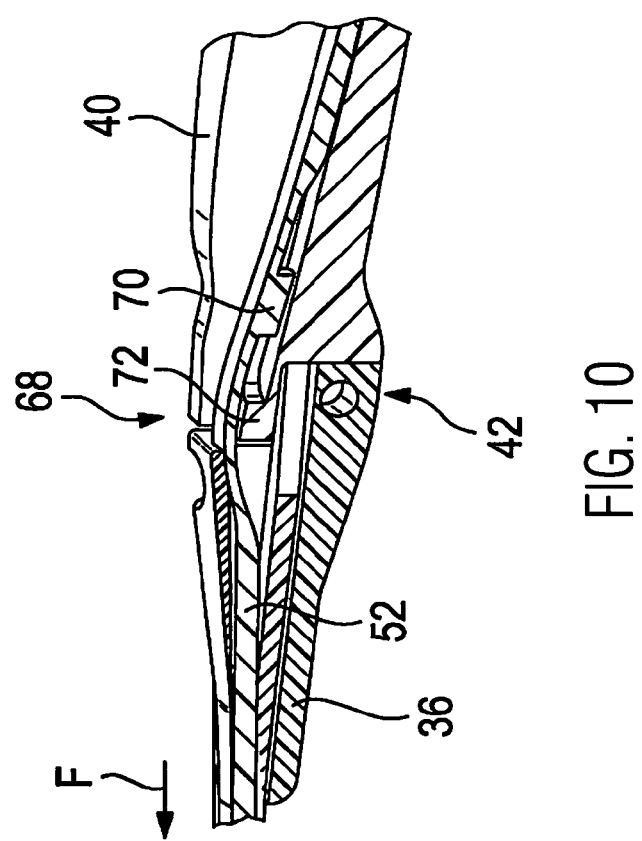
FIG. 10 is a schematic perspective sectional view of a hinge between a fixed arm portion and an end portion of the arm shown in FIGS. 8 and 9.

The FIGS. 6 to 10 show a movement mechanism 50 for moving the end portion 40 and for unfolding and folding the finger 44. The FIGS. 8 and 9 show the arm 22 from the underside, i.e. the side on which the finger 44 is not arranged.

The movement mechanism 50 includes a transmission element 52 leading along the longitudinal direction L of the arm 22 from the end of the arm portion 36 connected to the height adjuster to the link point 54 at which one end of the finger 44 is connected to the end portion of the arm.

The link point 54 of the finger is arranged closely to the free end of the end portion 40 so that the finger 44 in the unfolded position is positioned as closely as possible to the free end of the end portion 40.

At its end arranged on the side of the height adjuster the transmission element 52 includes a second element of attack 56, which is in the form of a bent end here. The transmission element 52 in this example is a flat elongated synthetic element which is also compression-rigid. At the finger-side end the transmission element 52 includes a gearing 58 engaging in a gearing 60, here in the form of a gearwheel, which is connected for co-rotation with the finger 44 and is rotatable about the link point 54 thereof. When a force F is applied to the transmission element 52 at the second element of attack 26 in the direction away from the end portion 40 along the longitudinal direction L (cf. FIG. 9), the rack-and-pinion drive 58, 60 ensures folding of the finger 44 into the recess 46.

A spring in the form of a spiral spring 62 is arranged at the fixed arm portion 36 and acts on a stop 64 in the transmission element 52, the spring force counteracting the tensile force F. The spring force of the spring 62 pushes the transmission element 52 toward the end of the end portion 40, wherein the finger 44 is moved to the unfolded position by the movement of the gearings 58, 60.

The same moving mechanism 50 also moves the end portion 40 from the normal position into the bent position and back. This is evident from FIGS. 6 and 10. A guide 68 and a stop 70 formed in the transmission element 52 which interacts with a second stop 72 formed in the end portion 40, when the transmission element 52 has covered a predetermined distance in the direction away from the free end of the end portion 40, ensure that the arm is pulled into the bent position at the end portion 40 (upwards in FIGS. 8 to 10). The hinge 42 is configured so that a resistance is set against a further bending movement.

The spring 62 acting on the stop 64 also in this case causes the end portion 40 to be returned to the normal position when the force F on the transmission element 52 subsides.

Instead of the synthetic element and the meshing gearings 58, 60 for moving the finger 44 also a Bowden cable could be employed.

The moving mechanism 50 is usually covered by a cover 66.

Since the pivoting movements both of the end portion 40 into the normal position and of the finger 44 into the unfolded position are caused by the force of the spring 62, both movements are carried out very quickly so that the strap can be safely seized.

The FIGS. 11 to 21 illustrate the operating mode of the drive 24 in larger detail.

In the examples shown here the drive 24 is an electrically driven spindle drive which is mounted on the slide 18 of the height adjuster. A linearly movable drive element 74 reciprocating along a tree rod 76, when the drive 24 is active, includes an acceptance 78 for the first element of attack 38 at the link portion 26. The acceptance 78 is configured so that it has certain play of several millimeters in the direction of movement of the drive element 74. Moreover, the acceptance 78 offers sufficient play perpendicularly to the direction of movement so as to be capable of compensating the lateral movement of the element of attack 38.

At the drive element 74 an extension in the form of a drawbar having an end-side stop 80 is rigidly mounted, the latter engaging in the second element of attack 56 when the arm 22 approaches the parking position P.

Figure 11:
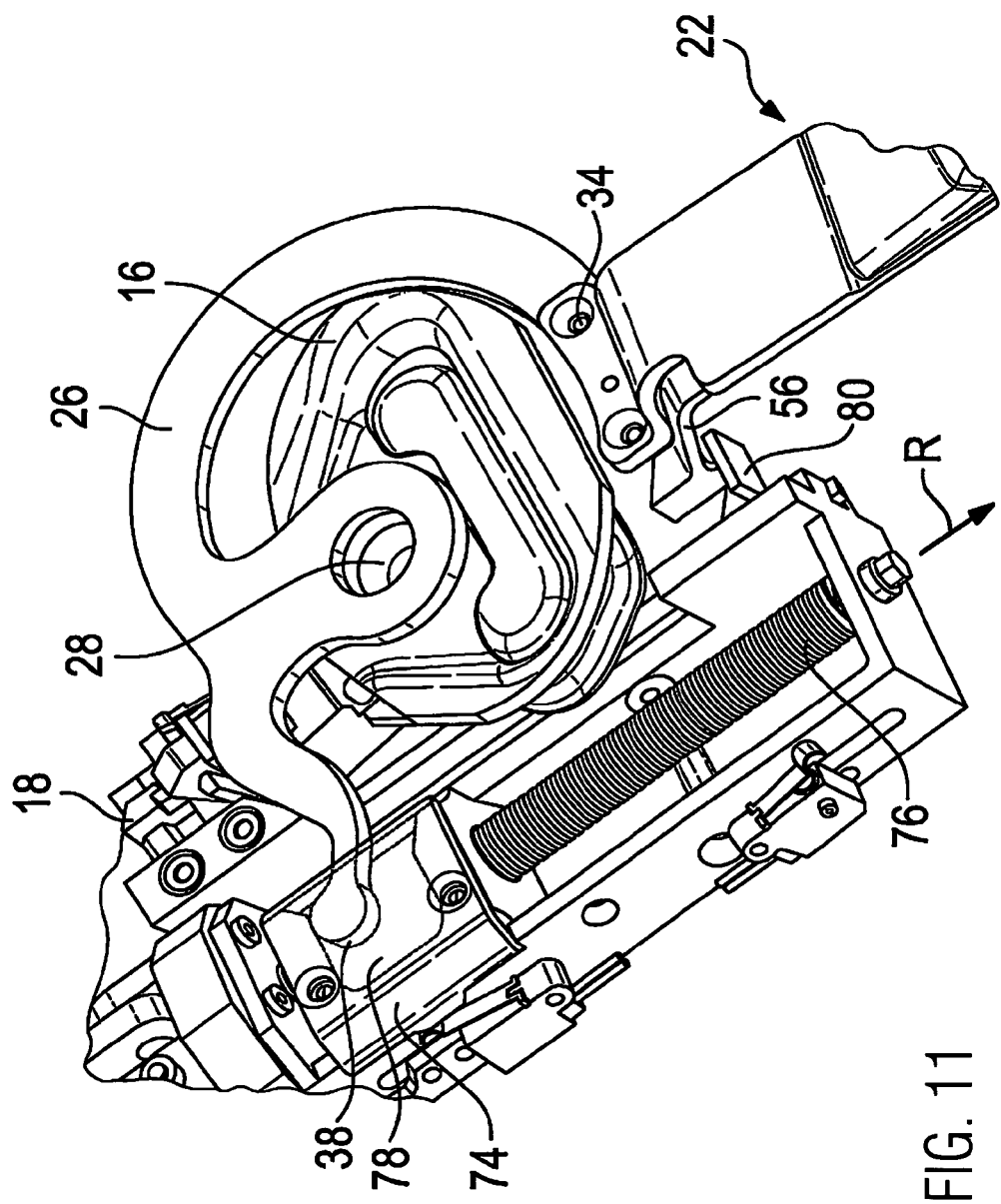
FIGS. 11 to 13 are schematic perspective views of the interaction of a drive element with the arm of the belt presenter of FIG. 1 according to a first variant.
Figure 12:
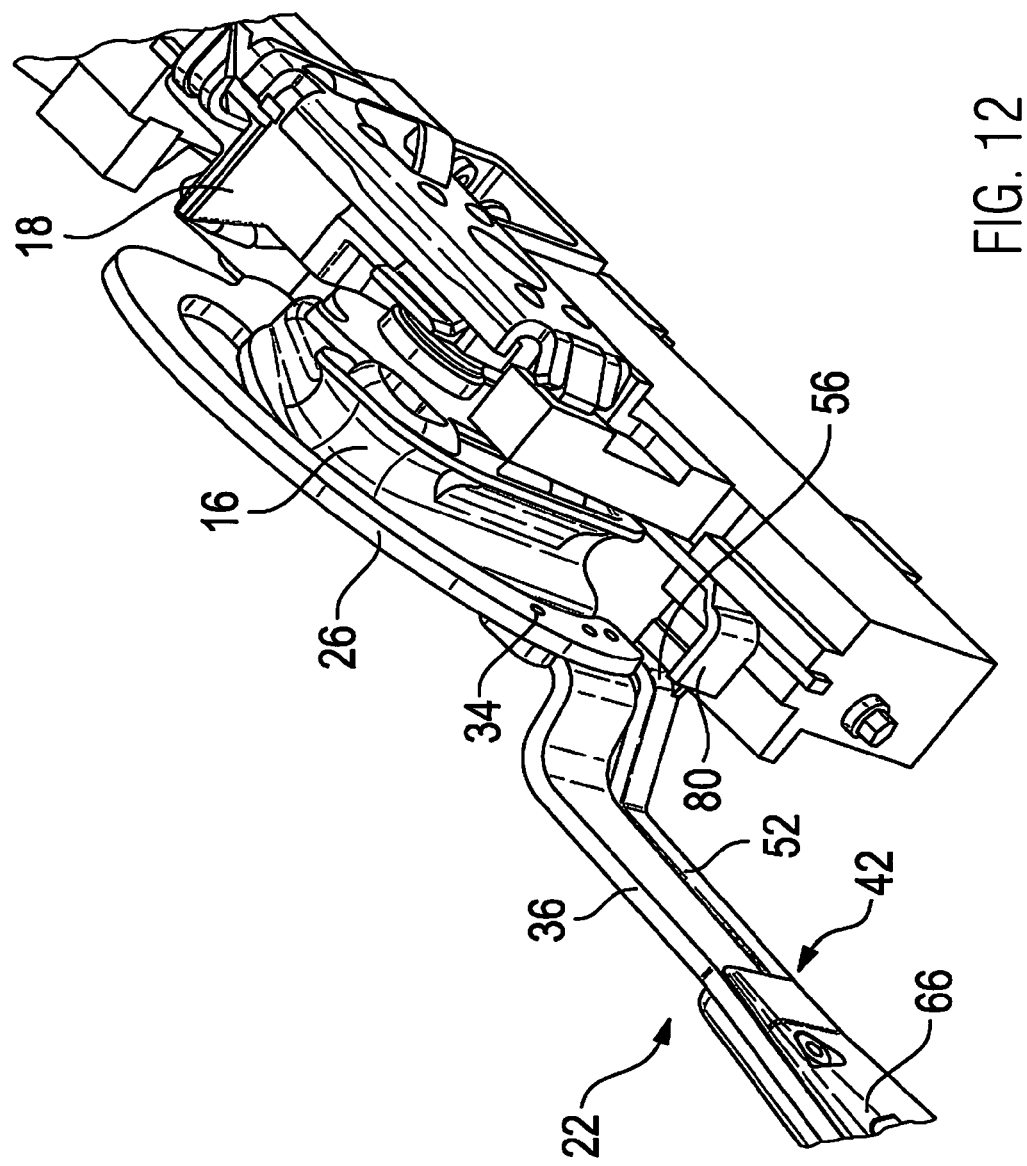
Figure 13:
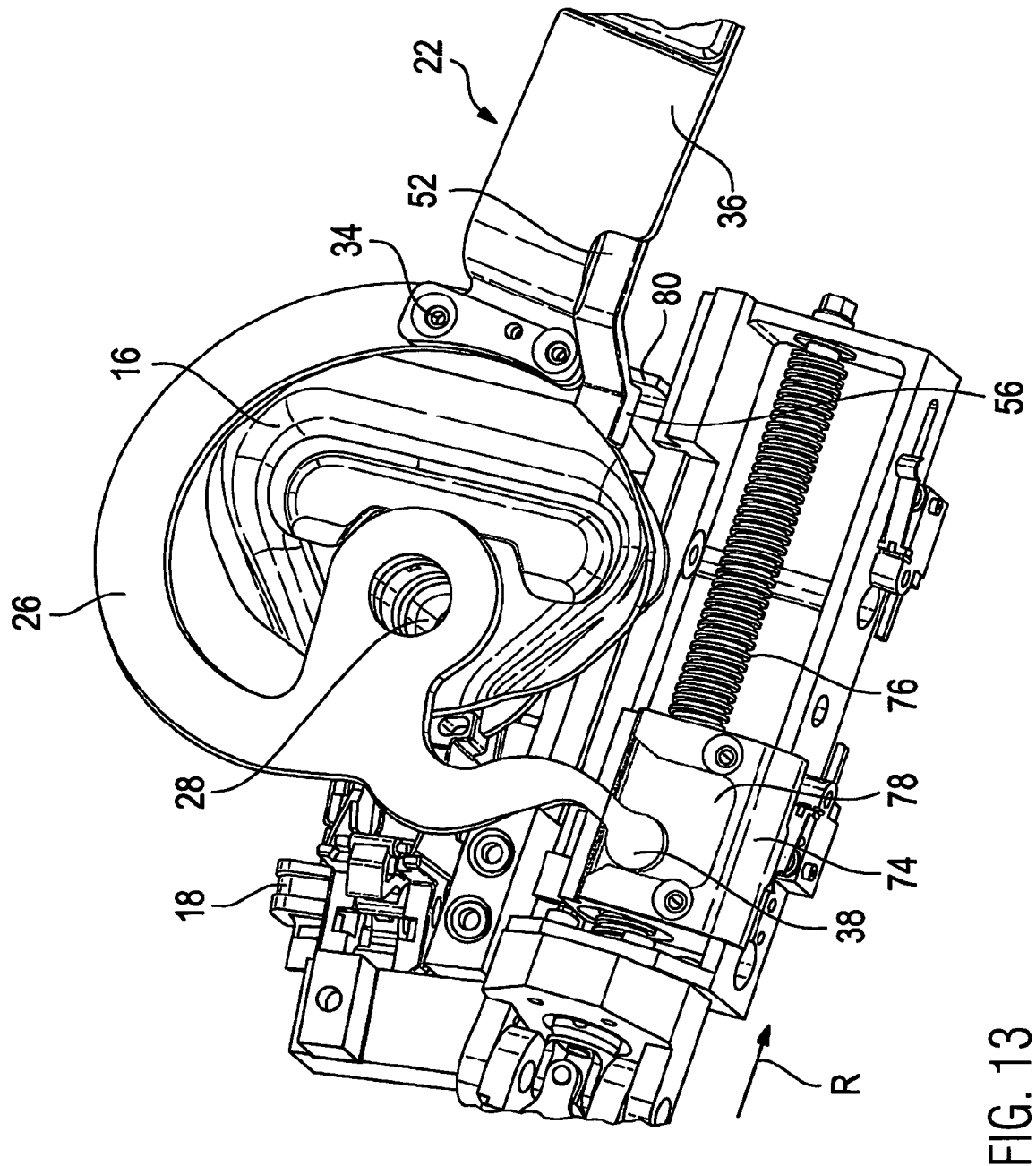

In FIG. 11 the belt presenter is shown in the parking position P. For displacement into the feeding position A the drive element 74 moves in the direction R (downwards related to the B-pillar).

By this movement the tensile force F acting via the stop 80 on the second element of attack 56 subsides so that the spring 62 starts pivoting the end portion 40 from the bent position into the normal position and then moving the finger 44 from the folded into the unfolded position. At the same time, the first element of attack 38 is moved in the direction R, thereby the link portion 26 and thus the entire arm 22 being pivoted. The further displacing movement of the drive element 74 then pivots the arm 22 into the feeding position A.

During reverse movement from the feeding position A into the parking position P the drive element 74 moves in the opposite direction. The second element of attack 56 has disengaged from the stop 80 by the pivoting movement so that only the force of the spring 62 acts on the end portion 40 and the finger 44. The end portion 40 thus remains in the normal position and the finger 44 remains in the unfolded position.

When the arm 22 has been pivoted completely into the parking position P, also the second element of attack 56 again contacts the stop 80. During further movement opposite to the direction R the stop 80 exerts a force F on the second element of attack 56 opposite to the direction R and acts, as described before, against the force of the spring 62 via the transmission element 52 on the finger 44 which is moved via the interaction of the gearings 58, 60 into the folded position and equally acts via the interaction of the stops 70, 72 on the end portion 40 so that the latter is pulled into its bent position.

Figure 15:
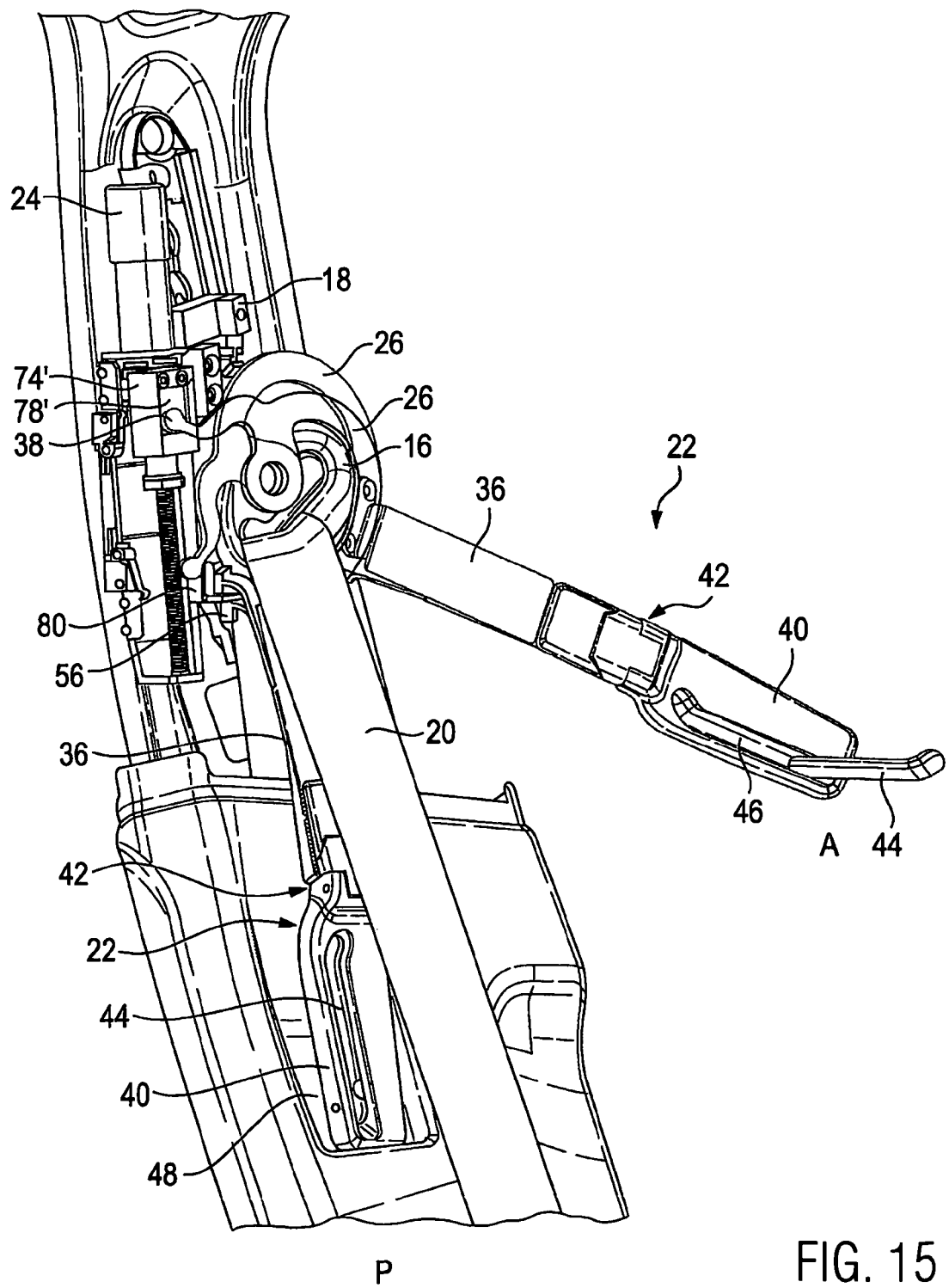
Figure 16:
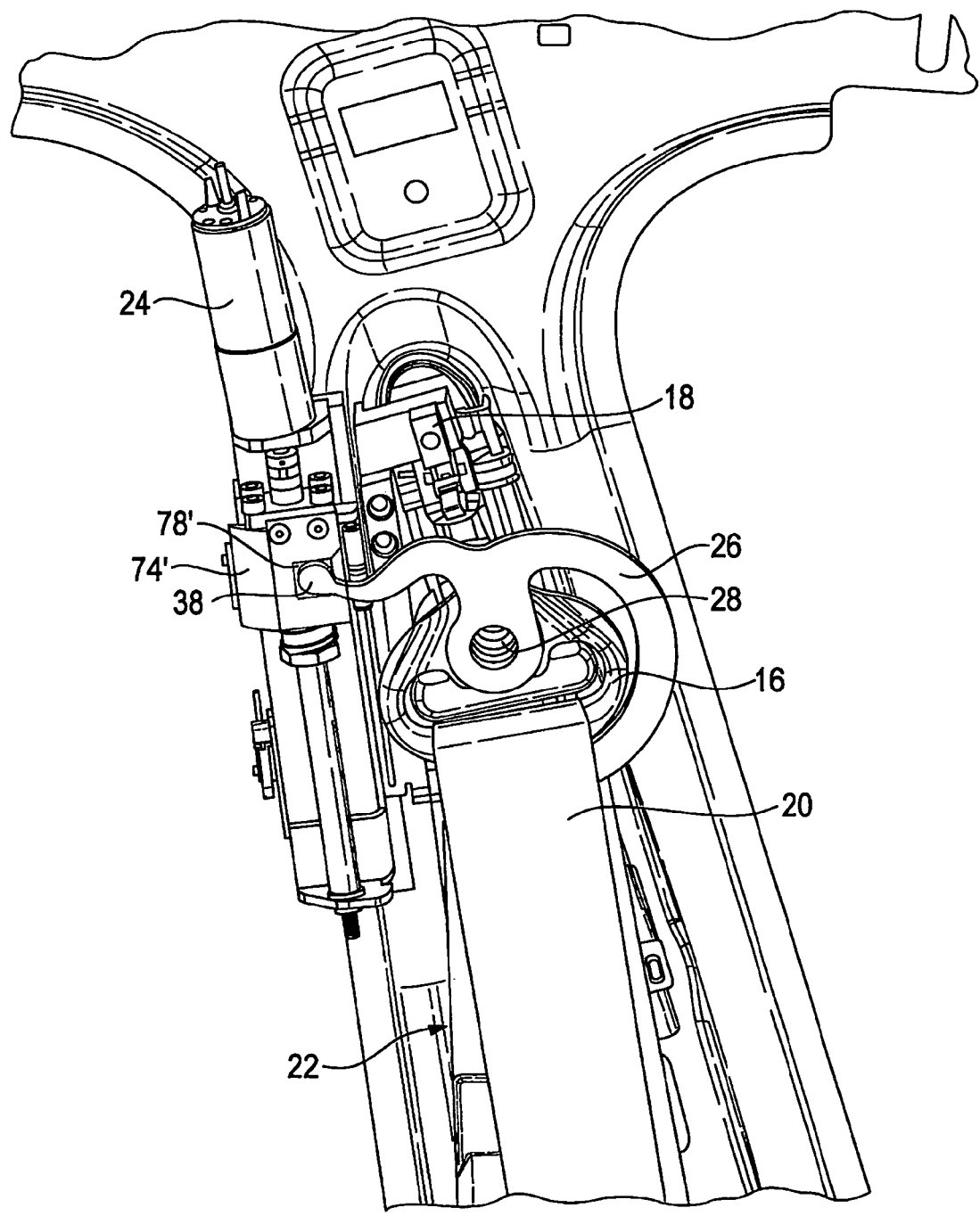
Figure 17:
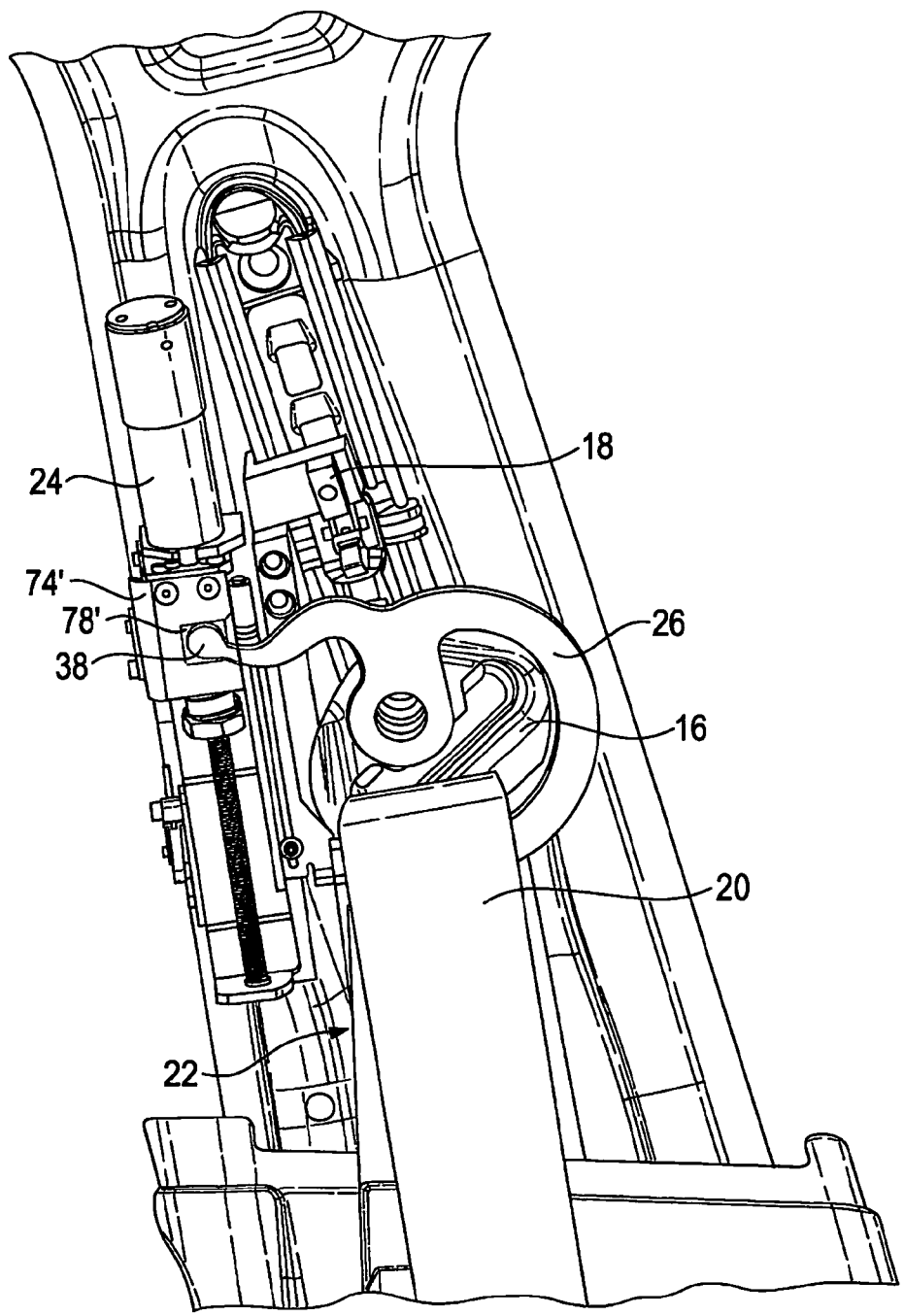
Figure 18:
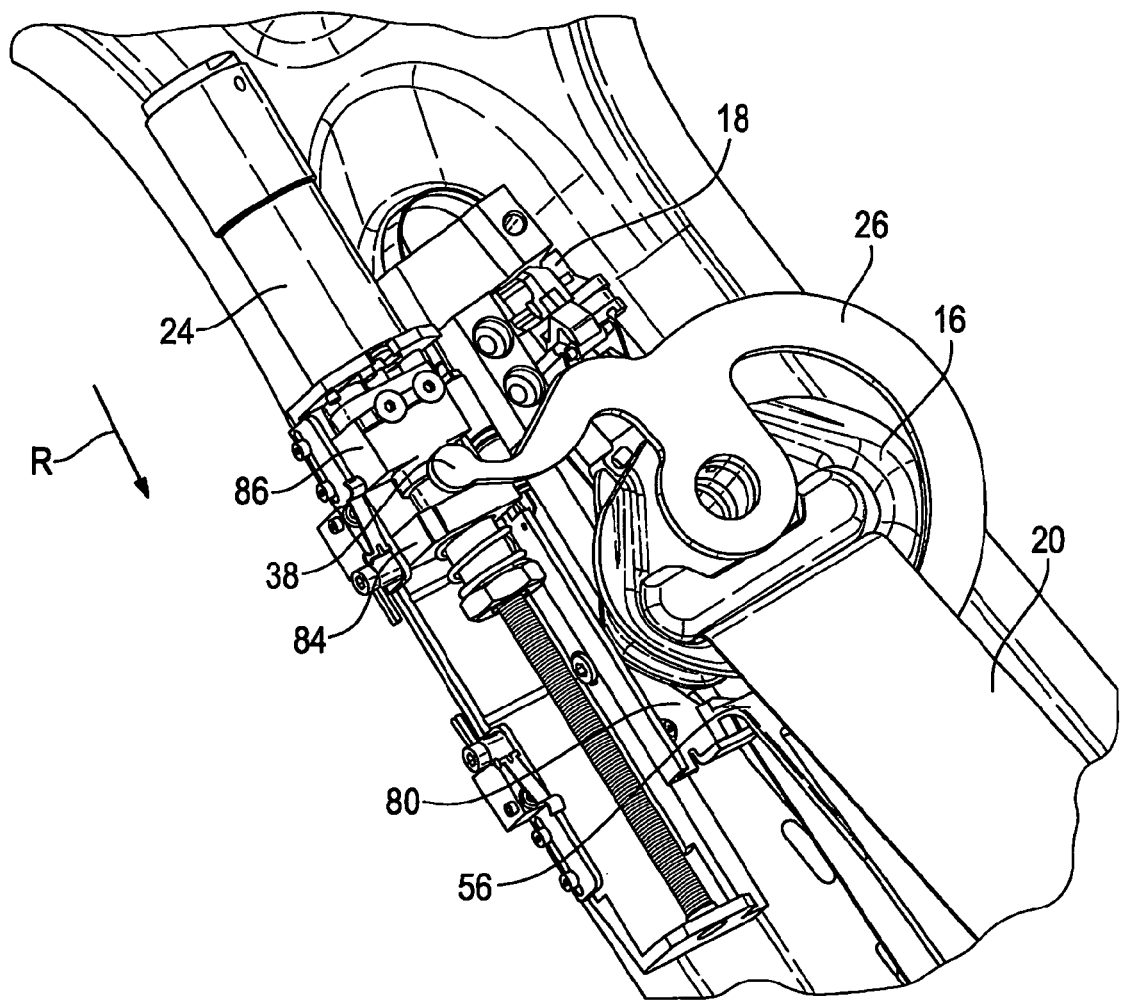
Figure 19:
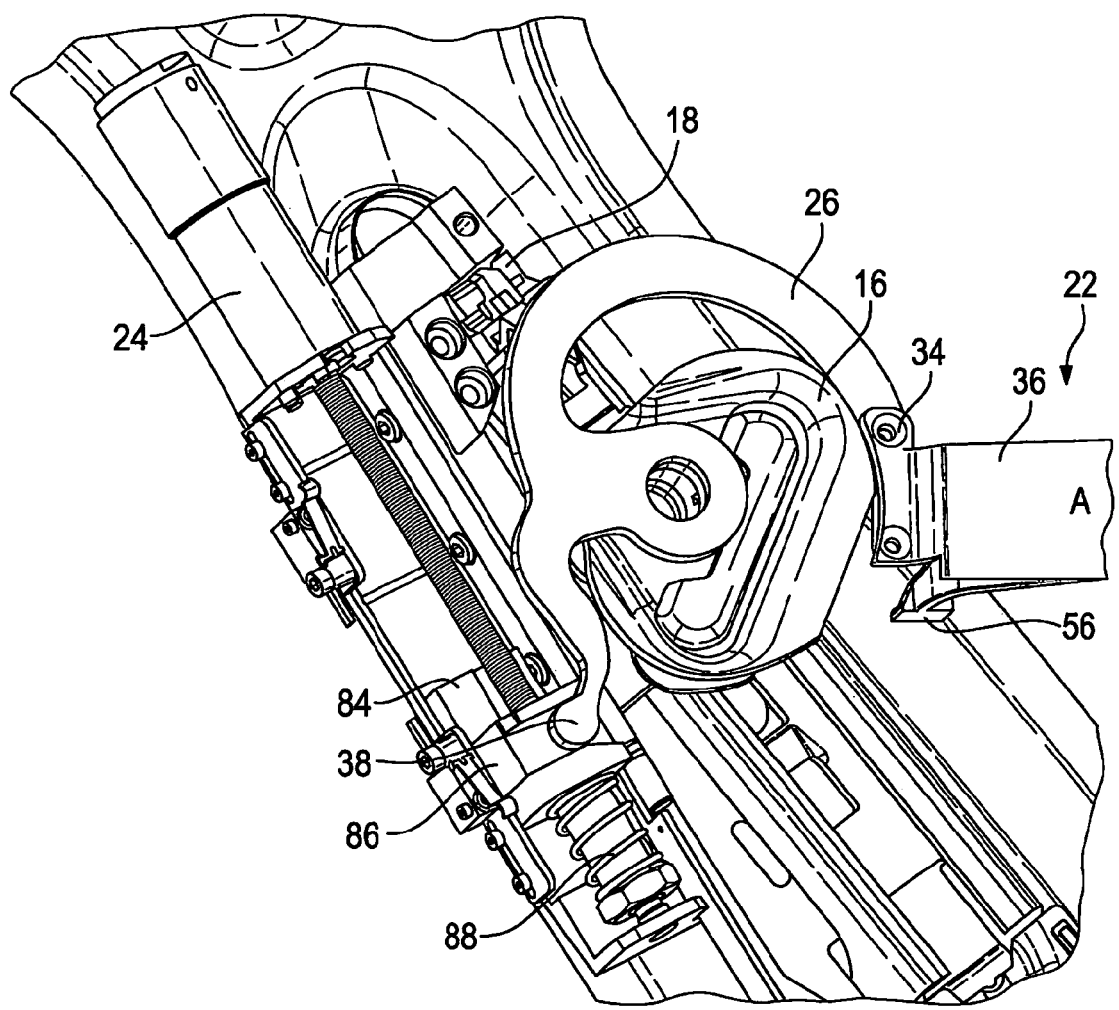
Figure 20:
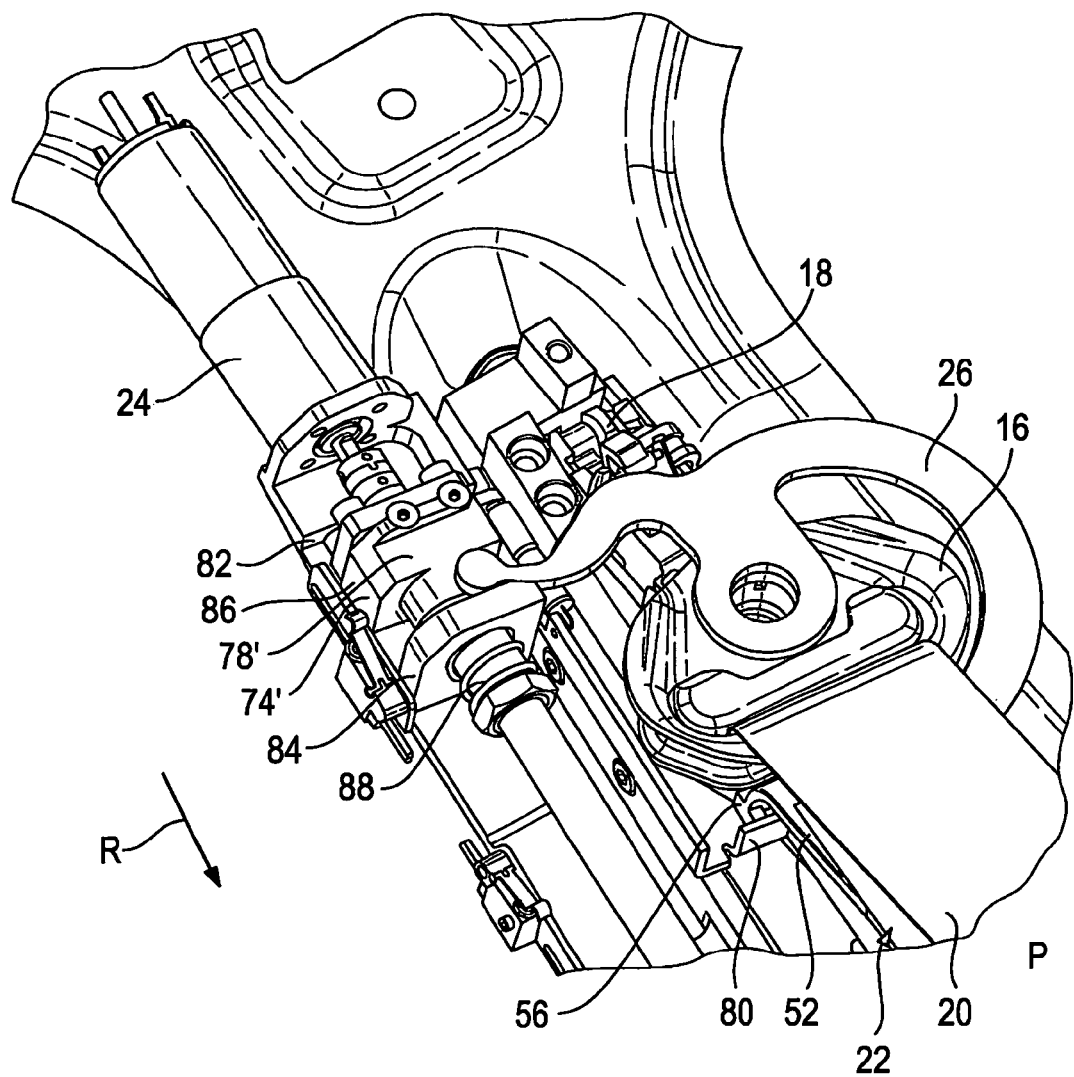
Figure 21:
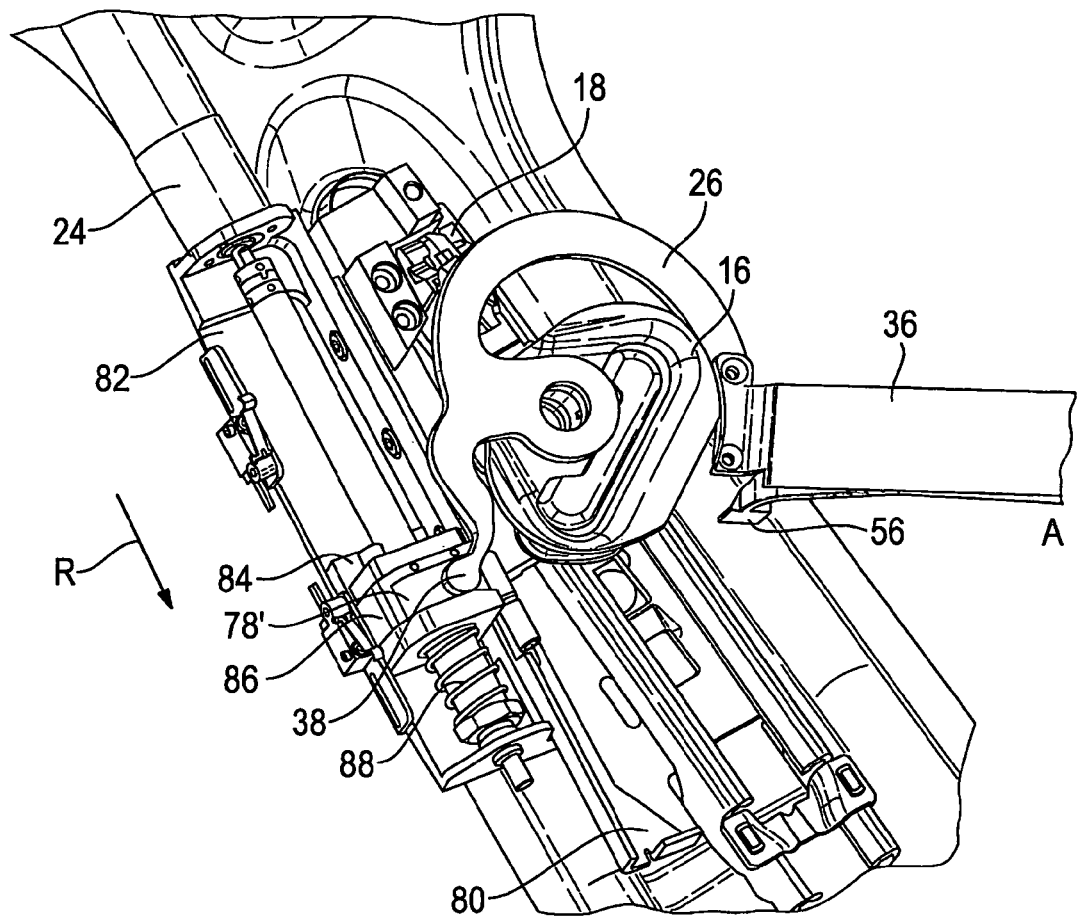

Since in these examples the drive 24 is mounted on the slide 18 of the height adjuster, the entire drive is moved when the height adjuster is actuated. FIG. 14 illustrates the state when the slide 18 has taken its highest position in the vehicle, while FIG. 15 illustrates the state when the slide 18 takes its lowest position in the vehicle. It has to be noted that the recess 48 in the lining 12 of the B-pillar along the B-pillar is selected to be so long that in the position of the slide 18 shown both in FIG. 14 and in FIG. 15 the end portion 40 can immerse into the recess 48.

Since the drive 24 and the entire mechanism of the belt presenter are mounted on the slide 18 of the height adjuster, the function of the belt presenter does not change with the position of the height adjuster.

Briefly summing up, in the first embodiment a transmission element counteracting a return spring is used in the arm. When the transmission element is pulled (which is the case when the system is in its home position), the end portion is folded down and the finger is folded in. When the transmission element is released (which takes place at the beginning of the pivoting movement of the arm), the return spring ensures that the end portion of the arm is outwardly adjusted (along an extension of the arm) and the finger is unfolded. Idling between the drive element 74 and the element of attack 38 provides for the course of the folding/pivoting movement correct in time of the end portion and the finger, on the one hand, and the pivoting movement of the arm, on the other hand.

The FIGS. 16 to 21 show a second variant of the aforedescribed mechanism. In this case the linearly moving drive element 74' of the spindle drive includes an acceptance 78' receiving the first element of attack 38 without play. The idling for separating the movement of pivoting the arm 22 and of unfolding and, resp., folding the finger 44 and moving the end portion 40 is achieved by a spring travel here, which is shown in more detail in FIGS. 20 and 21, for example.

The drive element 74' is composed of two parts in this case, a slide element 84 and a catch element 86 moved by the spindle thread, wherein a portion of the catch element 86 protrudes through an aperture in the slide element 84 and is loaded by a spiral spring 88 against the slide element 84 so that the catch element 86 also moves the slide element 84. The acceptance 78' is formed by an upper stop in the catch element 86 and a lower stop in the slide element 84. The spring force also ensures clamping of the first element of attack 38 between the catch element 86 and the slide element 84.

When moving out of the parking position P into the feeding position A toward R downwards along the B-pillar, the arm 22 is pivoted to the feeding position A by the drive element 74' downwards entraining the first element of attack 38.

At the beginning of the movement the second element of attack 56 is in mesh with the stop 80 of the transmission element and is loaded by the latter so strongly that the action of the spring 62 is overcome and the finger 44 is folded in and the end portion 40 is bent. First the catch element 86 moves vis-à-vis the slide element 84, wherein the transmission element tightly connected to the catch element 86 and thus the stop 80 are moved in the direction R. Thus the tensile force acting on the second element of attack 56 subsides so that due to the spring action of the spring 62 the finger 44 is brought into the unfolded position and the end portion 40 is brought into the normal position.

When the idling formed by the spring travel between the catch element 86 and the slide element 84 has been passed and the catch element 86 contacts the first element of attack 38, the latter is entrained by the drive element 74' in the direction R. Thus the pivoting movement of the arm 22 starts, thereby the mesh between the stop 80 and the second element of attack 56 being disengaged. Due to the spring action of the spring 62 the finger 44 remains unfolded and the end portion 40 is maintained in the normal position (not shown in FIG. 21).

Upon returning to the parking position P (FIG. 20) the second element of attack 56 contacts the stop 80 as soon as the arm 22 has reached the parking position. Upon the return movement to the parking position P the first element of attack 38 is moved by the slide element 84. The slide element 84 reaches an upper stop 82 which blocks further movement thereof opposite to the direction R. As the catch element 86 connected to the thread continues to be moved opposite to the direction R, however, it is moved away from the aperture in the slide element 84 against the force of the spring 88. The first element of attack 38 is not continued to be moved, however, so that the arm is not further pivoted, either.

However, the stop 80 which is tightly connected to the catch element 86 is moving; therefore tension is exerted to the transmission element 52 via the second element of attack 56. This tension causes the finger 44 to be moved into the folded position and the end portion 40 to be displaced into the bent position.

Upon reaching the parking position P and folding the finger 44, the strap 20 is released again. The belt presenter is only in contact with the strap 20 when the belt is moved to the feeding position A. Otherwise the strap 20 is not in contact with the belt presenter. The arm 22 in this case exhibits a particular curvature above approx. 10 to 20° by which it is adapted to the course of the B-pillar lining 12. For a simplified description, however, a straight arm is assumed here.

The mechanism for moving the finger 44, the end portion 40 as well as the arm 22 is exemplified here; any other suitable mechanism comprising a directly engaging drive 24 or drive acting via interconnected actuators is imaginable, too.

For example, the drive could also be realized by elements of shape-memory alloys and the change of shape thereof.

The invention claimed is:

1. A belt presenter system for a seat belt system of a vehicle, comprising an arm (22) having a first end and a second end opposite the first end with a longitudinal axis extending from the first end to the second end, the first end being pivoted to a vehicle pillar, wherein the arm (22) can adopt a feeding position (A) and a parking position (P), the longitudinal axis of the arm pivoting relative to the pillar as the arm pivots relative to the pillar,
wherein an end portion (40) provided at the second end of the arm (22) is connected to a fixed arm portion (36) via a hinge (42) so that the end portion (40) is bendable relative to the fixed arm portion (36) out of a pivoting plane of the arm (22).

2. The belt presenter system according to claim 1, wherein the arm is fastened to a height adjuster for the seat belt mounted on the vehicle pillar.

3. The belt presenter system according to claim 1, wherein the end portion (40) of the arm (22) in the parking position (P) is in the bent position.

4. The belt presenter system according to claim 1, wherein in the bent position the end portion (40) of the arm (22) is accommodated in a recess (48) of a vehicle lining (12).

5. The belt presenter system according to claim 1, wherein that the arm (22) includes a link portion (26) which is rigidly connected to the fixed arm portion (36) and which is fastened to the height adjuster in the state mounted on the vehicle.

6. The belt presenter system according to claim 5, wherein at the link portion (26) a first element of attack (38) is provided which is communicated with a drive (24) of the belt presenter and is movable by the same.

7. The belt presenter system according to claim 6, wherein the drive (24) includes a linearly movable drive element (74; 74') which upon movement of the arm (22) and/or of the end portion (40) engages in the first and/or second element of attack (38, 56).

8. The belt presenter according to claim 7, wherein the drive element (74; 74') is formed so that idling is provided between the movement of the second and the first elements of attack (56, 38).

9. The belt presenter system according to claim 1, wherein at the arm (22) a moving mechanism (50) for moving the end portion (40) is provided which includes a second element of attack (56) that is communicated with a drive of the belt presenter and can be actuated by the same.

10. The belt presenter system according to claim 9, wherein the moving mechanism (50) includes a transmission element (52) interacting with a guide (60) formed at the fixed arm portion (36) and at the end portion (40), said guide causing the end portion (40) to bend.

11. The belt presenter according to claim 1, wherein the arm (22) includes a finger (44) for seizing the strap (20) when the arm (22) moves into the feeding position (A) and the finger is pivoted to the end portion (40) of the arm (22) so that it can adopt a folded position in which it is substantially in parallel to the end portion (40) of the arm (22) and an unfolded position in which the finger (44) is orientated substantially perpendicularly to the end portion (40) of the arm (22) and to a pivoting plane of the arm (22).

\* \* \* \* \*